United States Patent [19]

Jacobs et al.

[11] 4,228,362
[45] Oct. 14, 1980

[54] WIND ELECTRIC PLANT WITH IMPROVED ALTERNATOR FIELD EXCITATION

[76] Inventors: Marcellus L. Jacobs; Paul R. Jacobs, both of Rte. 13, Box 722, Fort Myers, Fla. 33908

[21] Appl. No.: 921,334

[22] Filed: Jul. 3, 1978

[51] Int. Cl.³ ............................................. F03D 9/00
[52] U.S. Cl. ................................... 290/44; 290/55
[58] Field of Search ............... 290/43, 44, 54, 55; 322/28, 35; 310/154

[56] References Cited

U.S. PATENT DOCUMENTS

| | | | |
|---|---|---|---|
| 1,331,998 | 2/1920 | Neuland | 310/154 |
| 2,579,311 | 12/1951 | Fairey | 290/55 X |
| 2,832,895 | 4/1958 | Hutter | 290/44 |
| 3,484,617 | 12/1969 | Winsel | 290/44 |
| 3,769,567 | 10/1973 | Cox | 322/28 X |
| 3,863,137 | 1/1975 | Mishima et al. | 322/28 X |

*Primary Examiner*—Gene Z. Rubinson
*Assistant Examiner*—W. E. Duncanson, Jr.
*Attorney, Agent, or Firm*—Shoemaker and Mattare, Ltd.

[57] ABSTRACT

An improvement in a wind electric plant of the type disclosed in applicants' U.S. Pat. No. 4,059,771 and applicants' co-pending application Ser. No. 887,373, filed Mar. 16, 1978. The improvement comprises utilization of an exciter including an exciter armature and an associated permanent magnet exciter field to provide the excitation current for the field winding of a three-phase alternator. The use of permanent magnets in the exciter field, in lieu of conventional exciter field windings, eliminates the utilization of battery current as the source of excitation current for the field winding of a three-phase alternator. The improved wind electric power plant is utilized to supply A. C. power to hot water heater loads and/or auxiliary loads such as air conditioners, devices to manufacture hydrogen gas, and the like, which may be solar powered. The present invention also provides associated circuitry operable so that power can be supplied alternatively to either the hot water heater loads or to the auxiliary loads thereby maintaining a constant load on the wind electric power plant to ensure the quiet operation of that plant.

37 Claims, 3 Drawing Figures

WIND ELECTRIC PLANT WITH IMPROVED ALTERNATOR FIELD EXCITATION

BACKGROUND OF THE INVENTION

The present invention relates, in general, to wind electric plants, and more particularly, to a wind electric plant of the type which includes a wind driven propeller or the like to drive an alternator for producing electrical energy as disclosed in applicants' U.S. Pat. No. 4,059,771, issued Nov. 22, 1977.

The above-referenced patent and applicants' co-pending application for Letters Patent Ser. No. 887,373, filed Mar. 16, 1978, disclose battery controlled variable speed alternator systems for wind electric operation wherein battery current is utilized as the source of excitation current for the field winding of the alternator which battery current controls the excitation of the alternator field to provide a relatively constant excitation current for the alternator field winding, whereby the alternator field is fully excited at substantially all speeds of operation thereof.

In U.S. Pat. No. 4,059,771, alternator output is controlled directly through controls responsive to alternator speed and battery voltage to provide a relatively constant excitation current for the field winding of the alternator from a storage battery, wherein battery current is directly applied to the alternator field and whereby the alternator field is fully excited at substantially all speeds of operation thereof.

In applicants' above-referenced co-pending application, an improvement of U.S. Pat. No. 4,059,771 is disclosed wherein alternator output is controlled indirectly through the field control of an exciter and battery current is utilized to provide the excitation current for the exciter field winding which thereby, via an associated exciter armature, controls the excitation of the alternator field winding. Associated circuitry is also provided so that power can be alternatively supplied to either hot water heater loads or to auxiliary loads, at least one of which is solar-powered, thereby maintaining a full or constant load on the wind electric power plant to ensure the quiet operation of that plant even at times of strong wind conditions.

In the present improvement, alternator output is controlled through the use of an exciter including an exciter armature and an associated permanent magnet exciter field which eliminates the use of battery current as the source of excitation current for the field winding of the alternator and which thereby eliminates the need for the more expensive solid-state battery current control system required in applicants' herein-referenced U.S. patent and co-pending application.

As disclosed in the above-referenced co-pending application, the inventors have found that the field of wind electric plants has need of means for energizing the field of an alternator so that the alternator can develop full voltage at slow speed while also permitting speed increases of two or three times the starting speed. Such means should also permit full control of the energy output of the overall device. The present improvement further satisfies this need by providing a wind electric plant which increases the efficiency of the alternator while at the same time advantageously providing a much less costly wind electric generation plant of the type described.

The inventors have noted that during the operation of a wind electric plant of the type described in U.S. Pat. No. 4,059,771 and, more specifically, during operation of a variable pitch speed controlled propeller device, there is considerable "on and off" pressure strain applied to the propeller area from the wind as a governor device, associated with the wind electric plant operates to change the pitch or blade angle of the propellers to keep them from overspeeding when the load is removed from the alternator. This "on and off" pressure against the propeller blades, caused by the rapid change in pitch of the propellers when the load on the alternator is removed, creates a considerable fluctuating pressure against the propellers, which is also applied against the wind electric plant and its supporting tower structure causing the tower to move back and forth to a considerable degree. This action places considerable strain on the tower and is repeated frequently when the alternator controls remove the load from the alternator. Also, frequent operation of the governor device causes considerable wearing of the governors' control parts.

Furthermore, the fluctuating pressure against the propellers, which is caused by the action of the governor device, causes the wind electric plant located at the top of the tower to sway. Since the wind electric plant has considerable weight, the swaying of that plant causes strain of and possible damage to the tower structure. As the wind pressure against the propellers reduces at the time when they "feather", the strain on these propellers is, accordingly, reduced greatly. Then as the governor device acts to change the pitch of the propellers, the pitch of these propellers being flattened to the wind, this action applies a considerable increase in wind pressure thereto. The action of the governor device causing the beforementioned fluctuating pressure on the propellers, which results in causing the tower structure to sway back and forth, is quite disadvantageous for the following reasons.

The inventors have noted that the sudden swaying of the tower, occurring when the governor device changes the pitch of the propeller blades, may cause the entire wind electric plant and its supporting tower structure to "spring back" or sway several inches. This movement places considerable strain on the propellers and their hub mounts as the propellers shift their operating plane in accordance with the action of the governor device.

The inventors have further noted that when large propellers are utilized such as those having a 20 foot diameter or larger, these propellers have nearly 1500 pounds of "centrifugal" weight in each blade during full speed operation and this "centrifugal" weight travels at a speed of over 100 miles-per-hour while the propellers operate in their revolving plane which is in line with their hub position. When the increased wind pressure is suddenly applied to the propeller diameter due to the action of the governor, the hub is pushed back, along with the wind electric plant and the tower structure, shifting the operating plane of the propellers and causing them to be "sprung" out of their revolving plane until they can shift their considerable "centrifugal" weight to a new position. These beforementioned actions create considerable strain and vibration which may cause damage to the entire wind electric plant system including the propeller blades, the tower structure and other parts of the tower. Furthermore, the resulting strain and vibration also causes jerking and shaking of the tail vane and other mounting and tower parts.

Accordingly, when the propellers are traveling at a high rate of speed and the propellers are forced to change their pitch or operating angle to the wind via the action of a governor device, when the load is removed from the alternator, considerable noise is created by the propellers due to the fact that they no longer present an airfoil contour to air movement past the propellers. This air movement past the propellers may exceed 100 M.P.H. tip speed even though the speed of the wind driving the propellers may only be 12 to 15 M.P.H. when there is no lead on the alternator.

Therefore, the field of wind electric plants has need of means for keeping a constant or full load on the wind electric plant in order to keep the propellers loaded. The present improvement satisfies that need by providing means to keep a constant load on the wind electric plant thereby ensuring quiet operation of that plant.

SUMMARY OF THE INVENTION

The present invention is an improvement of the wind electric plants of the type disclosed in above-referenced U.S. Pat. No. 4,059,771 and co-pending application Ser. No. 887,373, filed Mar. 16, 1978. In the present improvement, alternator output is controlled via the use of an exciter including an exciter armature and an associated permanent magnet exciter field which eliminates the use of battery current as the source of excitation current for the alternator field winding, thus increasing the efficiency of the alternator, and thereby eliminating the need for the more expensive soild state battery current control system required in the herein referenced U.S. patent and co-pending application. The use of permanent magnets in the exciter field, in lieu of conventional exciter field windings or electromagnets, eliminates the utilization of battery current as the source of excitation current for the alternator field winding and provides a relatively constant field pole magnetic strength to the exciter, which is required to enable the alternator device of a wind electric plant to produce full voltage over the entire speed range of the alternator, as provided in the herein-mentioned U.S. patent and copending application.

The inventors have found that the field of wind electric plants has need of means for energizing the field winding of an alternator so that the alternator can develop full voltage at a slow speed of operation while also permitting speed increases of two or three times the starting speed. The present improvement satisfies this need by providing a wind electric plant which increases the efficiency of the alternator while at the same time advantageously providing a much less costly wind electric generation plant.

An alternator that operates over a wide range of speed, such as required in wind driven propeller systems, must produce full voltage at the starting or cut-in speed thereof at times of low speed wind conditions and yet not exceed its full voltage capacity when the maximum speed of a wind driven alternator is reached during times of high speed wind conditions. If the magnetic strength of the exciter field is maintained at a constant level over the entire speed range of an alternator, this requirement is met. Therefore, the use of an exciter having a permanent magnet exciter field, as provided by the present improvement, thus increases the efficiency of the alternator and supplies, to the exciter, the same relatively constant field pole magnetic strength, as provided by the herein referenced U.S. patent and co-pending application, thereby satisfying this requirement.

The inventors have noted, and have ascertained through testing, that if the exciter field magnetic strength is kept constant, as it is with the present disclosed permanent magnet exciter field, the power input required to operate the alternator increased in direct proportion to the increased power output of the wind driven propeller as the wind speed increased, thus providing a balance between wind power delivered by the propellers and the power required to drive the alternator over its operating speed range.

The present invention thus provides a method of energizing the alternator field winding of a wind driven alternator device by maintaining the magnetic field strength of the exciter field at a constant level over the entire speed range of the alternator.

The present improvement further provides circuitry which operates to keep a constant load on a wind electric generation plant in order to maintain quiet operation of the propellers even at times of strong wind conditions. By providing means to keep a constant or full electric load on the alternator, which in turn keeps the propellers loaded, the present invention ensures the quiet operation of the propellers of the wind electric plant. Furthermore, by keeping the propellers loaded, the present device eliminates the "on and off" pressure strain or fluctuating pressure applied to the propellers by the action of a governor device which operates to change the pitch or blade angle of the propellers to keep them from overspeeding when the load is removed from the alternator.

Accordingly, by keeping a constant load on the wind electric plant, the present invention eliminates all of the disadvantages described heretofore including the bending back and forth of the propellers, the swaying movement of the wind electric plant, the strain of and potential damage to the tower structure and the swaying movement thereof, the considerable strain existing on the propellers and their hub mounts, the shifting of the operating plane of the propellers in accordance with the action of the governor device, the considerable strain and vibration which may cause damage to the entire wind electric plant system including the propellers, the tower structure and other parts of the tower; elimination of the jerking and shaking motion of the tail vane and other mounting and tower parts, the considerable wearing of the governors' control parts, and the noise generated by the propellers when the governor action or operation occurs. Additionally, by keeping a constant load on the wind electric plant, governor action is only required during severe storm or weather conditions which may only occur a few times a year, whereby the considerable advantage of eliminating wearing of the governors' parts is secured by the present invention.

Furthermore, since the utilization of a permanent magnet field eliminates the use of battery current, as described above, the present improvement permits the elimination of the energy loss of battery current exciter field magnetic flux generation, eliminates all of the extensive and expensive battery current control and regulation circuits, eliminates any battery requirement and its cost if no battery is to be charged by the wind electric plant, and saves the cost of all of the cables and/or wires previously needed to connect the storage battery and control circuits, located at ground level, to the alternator or exciter device which is located at the top of the tower structure. If the wind electric plant and tower structure is located on top of a hill, approximately 1000 feet of wiring may be needed to connect the battery and control circuits to the alternator or exciter at the top of the tower and according the cost of these cables and/or wires may be considerable.

The present invention further provides a wind electric generation system capable of alternatively supplying the D.C. power required to charge a bank of storage batteries, the A.C. power required to supply and energize hot water heater loads contained in a heat storage unit and the A.C. power to supply ballast resistor or other auxiliary loads wherein the electric power output of the wind electric plant is fully utilized at all times thusly greatly increasing the efficiency of the wind electric plant while ensuring the quiet operation of that plant.

The present invention also provides, in another embodiment thereof, a wind electric generation system capable of alternatively supplying A.C. power to hot water heater loads contained in a thermal storage unit or to various types of auxiliary loads which may be solar-powered such as air conditioners, devices which manufacture hydrogen gas or any type of electric load requiring A.C. power, or to ballast resistor loads thereby maintaining a constant load on the wind electric generation plant to ensure the quiet operation thereof and thereby efficiently utilizing the entire power output of that plant. Thus, a combined wind and solar energy electric generation system is provided wherein the power output of the wind electric plant may be diverted to assist in supplying solar-powered auxiliary loads.

Other features, objects, advantages and a fuller understanding of the instant invention will be had by referring to the following description and claims taken in conjunction with the accompanying drawings in which:

DETAILED DESCRIPTION OF THE INVENTION

Figure 1:
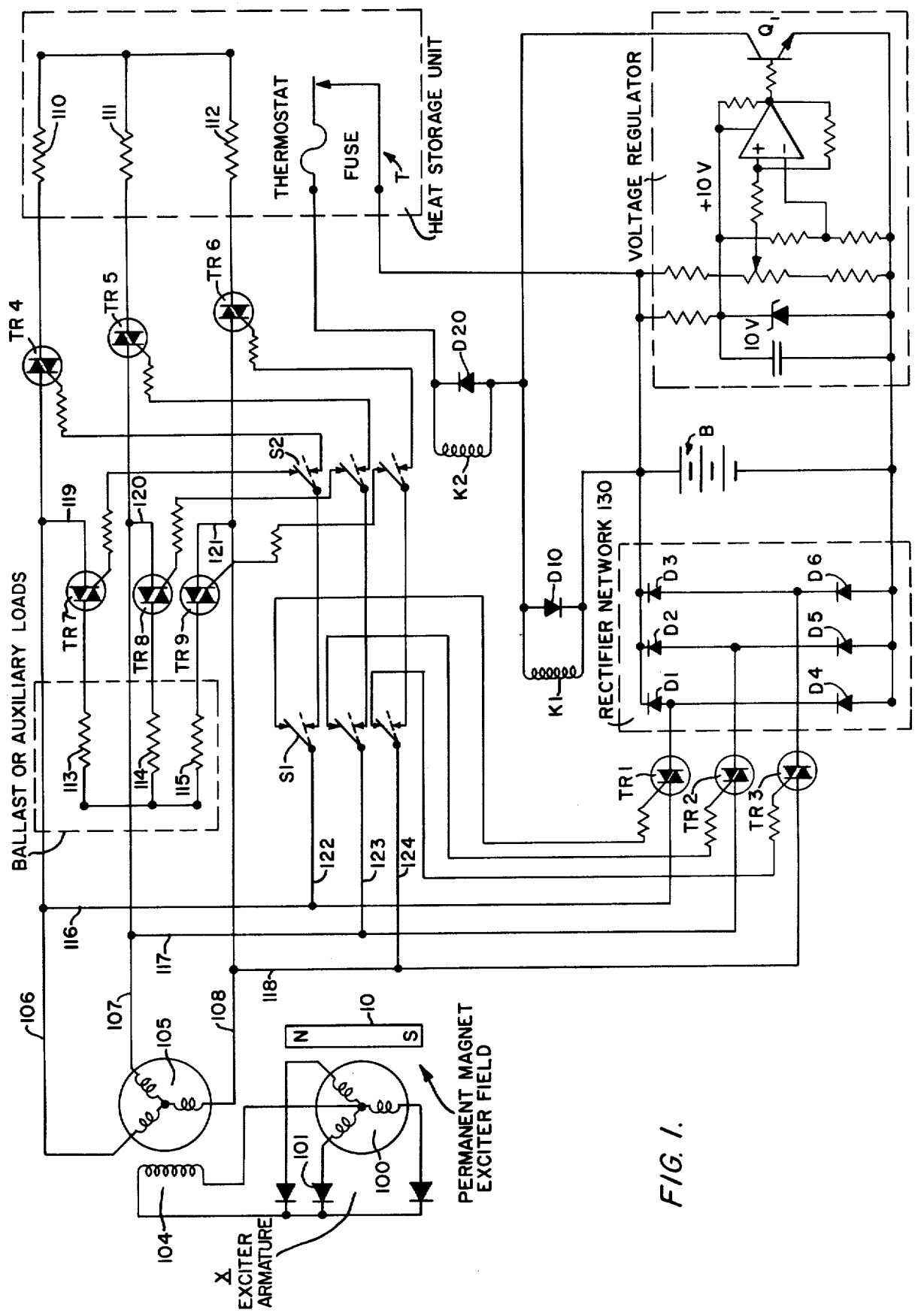
FIG. 1 is a schematic drawing illustrating a wind electric generation system, employing a permanent magnet exciter field, for supplying the D. C. power required to charge batteries and the A.C. power required to supply either hot water heater loads or other auxiliary or ballast loads.

Referring to FIG. 1, there is shown a schematic drawing of a wind electric generation system which incorporates a permanent magnet exciter field and which system supplies the D.C. power required to charge batteries B and A.C. power required to supply either hot water heater loads 110, 111, and 112, or ballast resistor or auxiliary loads 113, 114, and 115. As shown therein, the exciter includes an exciter armature X and a permanent magnet exciter field 10 associated therewith. The exciter armature X also includes a wye-connected transformer 100 having single diode means 101 in each output phase leg thereof and an alternator field winding 104 connected to the output thereof. The wind driven alternator device comprises an alternator field winding 104 and three-phase A.C. output transformer 105 having A.C. output phase legs 106, 107, and 108.

The wind electric plant of the present invention generally comprises a wind driven propeller device, a governor means (not shown), an alternator, and an exciter, all of which are mounted at the top of a supporting tower structure. The alternator rotor and the exciter armature are mounted on the same shaft which is rotatably driven by a wind driven propeller device.

Figure 3:
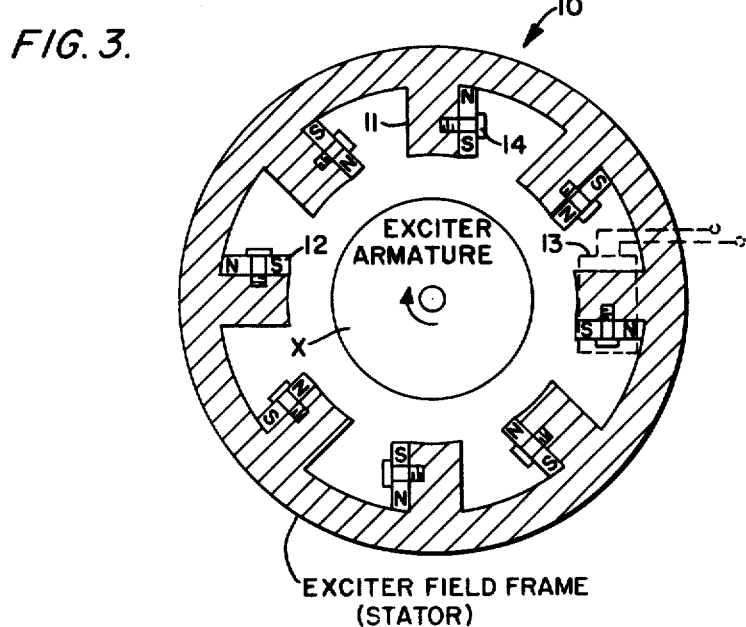
FIG. 3 is a cross-sectional view of the exciter and its permanent magnet exciter field.

Before discussing the operation of the wind electric generation system depicted in FIG. 1, the exciter and its associated permanent magnet exciter field will now be described as follows:

FIG. 3 illustrates a cross-sectional view of the exciter device utilized in conjunction with the three-phase alternator of the present invention. A conventional 8-pole exciter normally comprises an exciter armature and an exciter field frame (stator) which comprises eight (8) field poles, each of which have field wires or electromagnets attached thereto. As shown in FIG. 3, the exciter comprises a rotatably driven exciter armature X and an exciter field frame (stator) which comprises field poles 11 having permanent magnets (alnico) 12 attached thereto by means of bolts 14. As shown in FIG. 3, the exciter field frame is devoid of any field wires or electromagnets which are accordingly depicted in broken-line form. The inventors have taken a conventional 8-pole exciter and having modified it by, firstly, removing all of the field wires or electromagnets 13 from the field poles 11 and, secondly, attaching a permanent magnet means 12 to each field pole 11 of the exciter field frame. The permanent magnets 12 may be fixedly attached to the field poles 11 by any suitable means other than bolts 14. Thusly, an exciter having an associated permanent magnet exciter field is provided.

As shown in FIG. 1, the exciter armature or rotor output is connected to the alternator field winding 104. The permanent magnet exciter field 10 provides a constant field pole magnetic strength to the exciter armature and its wyeconnected transformer 100 which, in turn, via its output circuit, supplies D.C. excitation current to the alternator field winding 104 connected at its output. Since the magnetic strength of the exciter field is held constant, as it is with permanent magnets, this enables the alternator to produce full voltage over its entire speed range, as previously described.

The wind electric generation system of FIG. 1 provides associated circuitry that operates automatically to alternatively supply the power required by various load devices in order to maintain a constant or full electric load on the alternator at all times to ensure the quiet and efficient operation of the wind electric plant. As shown in FIG. 1, the alternator three-phase A.C. output transformer 105 includes A.C. output phase legs 106, 107, and 108 which are connected in circuit to a battery charging network through circuit lines 116, 117, 118 and respective TRIACS TR1, TR2, and TR3. Phase legs 106, 107, and 108 are further connected in circuit to hot water heater loads 110, 111, 112 and ballast resistor or auxiliary load devices 113, 114, 115 through TRIACS TR4, TR5, TR6 and TR7, TR8, TR9, respectively. These TRIAC devices are A.C. triggered TRIACS, the operation of which is well-known. As shown, the gate electrodes for each of the beforementioned TRIAC devices are connected in circuit to phase legs 106, 107, and 108 through two separate, three pole-double throw switch means S1 and S2. Relays K1 and K2, which respectively control the operation of switch means S1 and S2, are connected in circuit with a battery charging network comprising rectifier network 130, a bank of batteries B to be charged, and a voltage regulator means. Diodes D10 and D20, connected respectively across relays K1 and K2, are anti-kickback diodes provided for the protection of these relays. Relay K1 is connected in circuit between the output of the voltage regulator and the battery charging network, as shown in FIG. 1. Relay K2 is connected in circuit with the thermostat device T of the heat or thermal storage unit and the circuit line connecting K1 to the collector of Q1 of the voltage regulator means.

The output of the alternator is initially used to charge the electrical energy storage batteries B. Diodes D1 through and including D6 form a full wave 3-phase battery charging rectifier device 130 which is connected between TRIACS TR1, TR2, TR3 and batteries B. The operation of the wind electric generation system is as follows:

With switch means S1 and S2 in the "up" position, as shown in FIG. 1 (Relays K1 and K2 de-energized) and with the alternator outputting A.C. power on phase legs 106, 107, and 108 (when the wind electric plant is in operation), TRIAC devices TR1, TR2, and TR3 are energized, via their respective gate electrodes, to supply A.C. power from phase legs 106, 107, and 108 to the rectifier network 130 as follows: phase leg 106, line 116 through TR1 to the junction of D1 and D4; phase leg 107, line 117 through TR2 to the junction of D2 and D5; and phase leg 108, line 118 through TR3 to the junction of D3 and D6. TRIAC devices TR1, TR2, and TR3 are energized by the application of an A.C. signal to each of their respective gate electrodes as follows: A.C. signal applied from phase leg 106, line 116, line 122 through the top switch blade connection of S1 to the gate electrode of TR1; A.C. signal applied from phase leg 107, line 117, line 123 through the middle switch blade connection of S1 to the gate electrode of TR2; and an A.C. signal applied from phase leg 108, line 118, line 124 through the bottom switch blade connection of S1 to the gate electrode of TR3.

Rectifier network 130 provides the D.C. current required to charge batteries B and the voltage regulator device, which is connected across the batteries B, is utilized to ascertain when the batteries have attained a full charge level. Any suitable type of voltage regulator circuit device, similar to that shown in FIG. 1, may be used and the operation of the depicted voltage regulator will not be described in that the operation thereof is well-known.

When "full" battery voltage is sensed by the voltage regulator, transistor Q1 conducts thereby energizing relay K1. If the thermostat T associated with the heat storage unit is closed, relay K2 is also energized. The energization of relays K1 and K2, respectively, cause switch means S1 and S2 to be actuated to the "down" position which is shown in broken line form in FIG. 1. With S1 in the "down" position, the A.C. gate signals applied to TR1, TR2, and TR3 are removed, thereby de-energizing these TRIAC devices which cease to supply power to rectifier network 130. With S1 and S2 actuated to the "down" position, TRIACS TR4, TR5, and TR6 are energized to supply A.C. power from phase legs 106, 107, and 108 to their respectively connected hot water heater loads 110, 111, and 112. TRIACS TR4, TR5, and TR6 are energized by the application of an A.C. signal to each of their respective gate electrodes as follows: A.C. signal applied from phase leg 106, line 116, line 122, top switch blade connection across S1, and through the top switch blade connection across S2 to the gate electrode of TR4; A.C. signal applied from phase leg 107, line 117, line 123, middle switch blade connection across S1, and through the middle switch blade connection across S2 to the gate electrode of TR5; and an A.C. signal applied from phase leg 108, line 118, line 124, bottom switch blade connection across S1, and through the bottom switch blade connection across S2 to the gate electrode of TR6. With S1 and S2 in the "down" position, TRIACS TR7, TR8, and TR9 are de-energized and no power is supplied to the ballast resistor or auxiliary load devices 113, 114, and 115.

When thermostat T "opens" thereby indicating that the temperature of the heat storage unit, or the like, is at or above the desired temperature, relay K2 is de-energized and switch means S2 returns to its "up" position, which thereby removes the A.C. gate signals from the gate electrodes of TRIACS TR4, TR5, and TR6 and applies these A.C. gate signals to the gate electrodes of TRIACS TR7, TR8, and TR9, whereupon TRIACS TR7, TR8, and TR9 are energized to respectively supply A.C. power from phase legs 106, 107, and 108, through lines 119, 120, and 121, respectively, to their respectively connected ballast resistor or auxiliary loads 113, 114, and 115.

The heretofore mentioned description of the circuit operation of FIG. 1 ensures that a full or constant electric load is at all times connected to the alternator output of the wind electric plant thereby increasing the efficiency of said alternator while at the same time ensuring the quiet operation of the wind electric plant.

Other operations of the wind electric generation system of FIG. 1 should be apparent in view of the above description.

Figure 2:
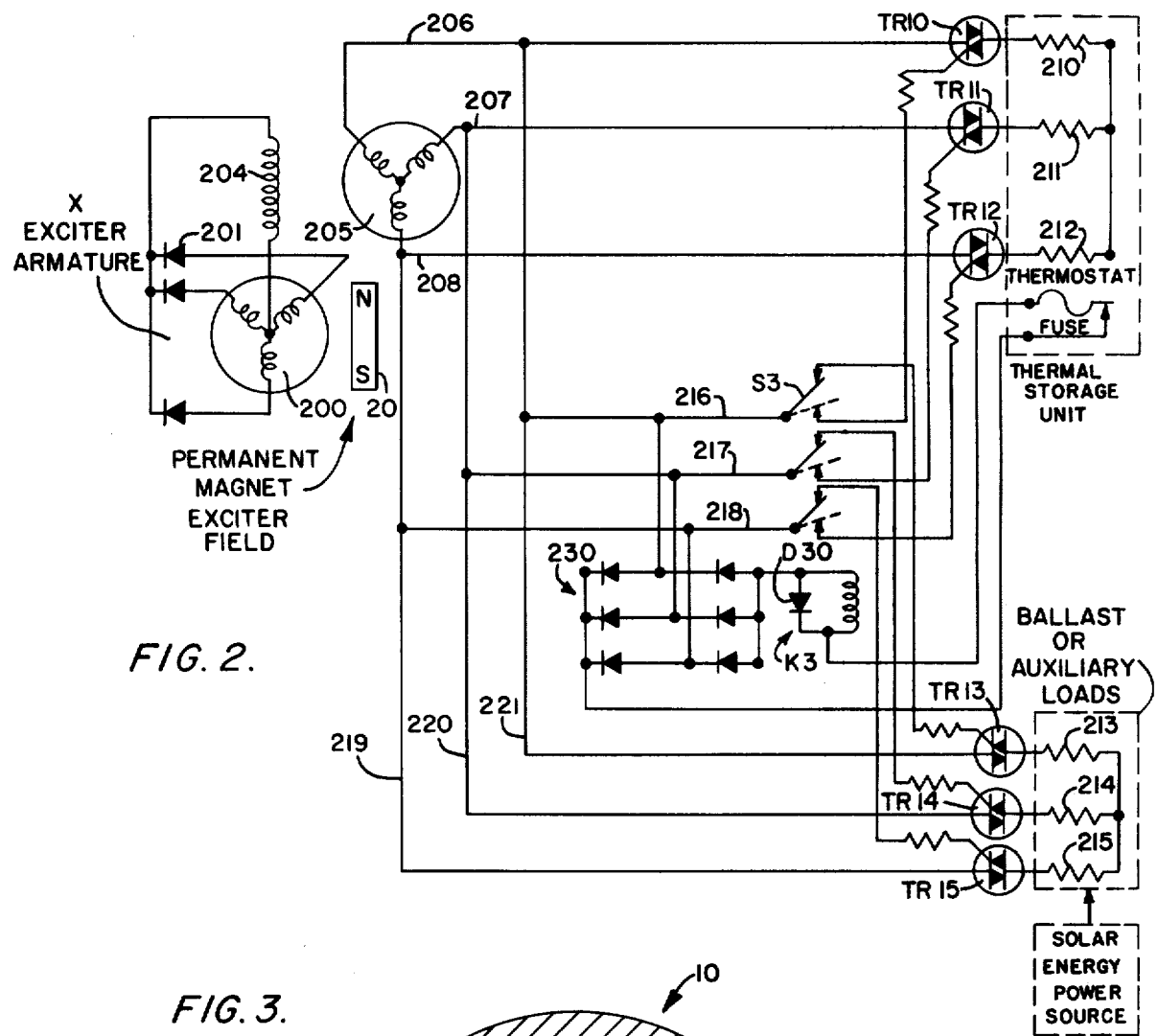
FIG. 2 is a schematic drawing illustrating another embodiment of a wind electric generation system, employing a permanent magnet exciter field, wherein a combined wind and solar electric generation system is shown.

The combined wind and solar electric generation system depicted in FIG. 2 will now be discussed as follows:

As shown in FIG. 2, the wind electric generation system incorporates a permanent magnet exciter field 20. The A.C. power output of the wind electric system is utilized to supply the A.C. power required to energize and operate hot water heater loads 210, 211, and 212 contained in a thermal or heat storage unit. Associated circuitry is provided to automatically divert the supply of power from the hot water heater loads to ballast resistor or auxiliary load devices 213, 214, and 215, which further receive power from a solar energy power source. Thus, the power output of the wind electric generation system may be diverted to assist in supplying supplemental power to the solar powered loads 213, 214, and 215.

With reference to FIG. 2, the exciter includes an exciter armature X and a permanent magnet exciter field 20 associated therewith. The exciter armature includes a wyeconnected transformer 200 having single diode means 201 in each output phase leg thereof and an alternator field winding 204 connected to the output thereof. The wind driven alternator device comprises an alternator field winding 204 and threephase A.C. output transformer 205 including A.C. output phase legs 206, 207, and 208. This wind electric generation plant corresponds to that shown in FIG. 1 and need not be discussed further with regard to its operation.

A.C. output phase legs 206, 207, and 208 are connected in circuit to hot water heater loads 210, 211, and 212 through TRIACS TR10, TR11, and TR12, respectively, and are further connected in circuit to ballast resistor or auxiliary loads 213, 214, and 215, as follows:

phase leg 206, line 221 through TR13 to load 213; phase leg 207, line 220 through TR14 to load 214; and phase leg 208, line 219 through TR15 to load 215. As shown in FIG. 2, the gate electrodes for each of the beforementioned TRIACS are connected in circuit to phase legs 206, 207, and 208 through a three-pole-double throw switch means S3 which is controlled and actuated by relay K3. Relay K3 is connected in circuit between the thermostat of the thermal storage unit and rectifier network 230, which supplies the D.C. current required to energize relay K3. Rectifier network 230 comprises a threephase rectifier device which is connected, as shown, to phase legs 206, 207, and 208 through lines 216, 217, and 218, respectively. D40 is connected across relay K3 for the protection of relay K3.

With switch means S3 in the "up" position (relay K3 de-energized, thermostat "open") and with the alternator outputting A.C. power on phase legs 206, 207, and 208, TRIACS TR13, TR14, and TR15 are energized, via their respective gate electrodes, to supply A.C. power to their respectively connected loads 213, 214, and 215. This application of A.C. power supplements that power supplied to loads 213, 214, and 215 by the solar energy power source.

When the thermostat "closes", thereby indicating that the temperature of the heat storage unit or the like is below the desired temperature, relay K3 is energized via rectifier network 230. The energization of relay K3 causes switch means S3 to be actuated to its "down" position which thereby removes the application of the A.C. gate signals from the gate electrodes of TR13, TR14, and TR15 and applies these A.C. gate signals to the gate electrodes of TR10, TR11, and TR12 which causes TRIACS TR13, TR14, and TR15 to cease supplying A.C. power to their respectively connected loads. Accordingly, when the A.C. gate signals are applied to the gate electrodes of TR10, TR11, and TR12, these TRIACS are energized to supply A.C. power from phase legs 206, 207, and 208 to their respective hot water heater loads 210, 211, and 212.

Conversely, when the thermostat "opens", thereby indicating that the temperature of the thermal storage unit is at or above the desired temperature, relay K3 is de-energized, switch means S3 returns to its "up" position and the A.C. power is diverted back to supply the ballast resistor or auxiliary loads 213, 214, and 215.

The above description of the circuit operation of the combined wind and solar electric generation system of FIG. 2 ensures that a constant or full electric load is at all times connected to the alternator output of the wind electric plant thereby increasing the efficiency of that plant while at the same time ensuring the quiet operation thereof.

The separate uses of the present invention, as disclosed herein, are merely for the sake of convenience and are not intended to be limiting. Thus, combinations of the two systems can be effected without departing from the scope of the present invention.

Furthermore, various different types of exciters may be modified, in accordance with the teaching of the present invention, to include a permanent magnet exciter field.

As this invention may be embodied in several forms without departing from the spirit or essential characteristics thereof, the present embodiments are, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. An improvement in a wind electric plant of the type including a wind driven propeller means or the like supported at the top of a tower and connected to drive an alternator supported on the tower to generate electrical energy, and means connected to be supplied by the alternator, and wherein a substantially constant current is supplied to the field winding of the alternator via an electrical control circuit means at substantially all speeds of operation of the wind electric plant within a predetermined range of speeds to excite the field of the alternator and thus obtain full excitation of the alternator field at substantially all speeds of operation of the wind electric plant within said range, the improvement comprising: exciter means connected with said alternator, said exciter means including a permanent magnet exciter field wherein the substantially constant current supplied to the field winding of said alternator is supplied via said exciter means so that the alternator field can be fully energized at slow speed and have such field saturation condition maintained over the entire speed range of said alternator, thereby permitting operation of the wind electric plant without the said electrical control circuit means and its source of supply voltage.

2. The improvement defined in claim 1 wherein said means connected to be supplied by the alternator includes load means requiring A.C. energy, said load means being connected to the A.C. output circuit of said alternator.

3. The improvement defined in claim 2 wherein said load means requiring A.C. energy includes a first load means which includes a water heating means.

4. The improvement defined in claim 3 further including second, auxiliary load means.

5. The improvement defined in claim 4 further including circuit means operable to selectively supply A.C. power to said first load means and said second, auxiliary load means.

6. The improvement defined in claim 5 wherein said circuit means includes means to automatically divert the supply of A.C. power to and from said first load means and said second, auxiliary load means thereby maintaining a constant load on the wind electric plant to thereby insure quiet operation of said wind electric plant even at times of strong wind conditions, and to thereby eliminate the occurrence of any damage to a wind electric plant caused when its load is removed therefrom.

7. The improvement defined in claim 6 wherein the entire power output of said alternator is fully utilized thereby increasing the efficiency of the said wind electric plant.

8. The improvement defined in claim 6 wherein said second, auxiliary load means includes an air conditioning device.

9. The improvement defined in claim 6 wherein said second, auxiliary load means includes a hydrogen gas manufacturing device.

10. The improvement defined in claim 6 wherein said second, auxiliary load means includes ballast resistor means.

11. The wind electric plant defined in claim 6 further including governor means supported at the top of a tower wherein said governor means operates to change the pitch of the propellers of the wind driven propeller means to keep the propellers from overspeeding during severe storm or weather conditions.

12. The wind electric plant defined in claim 11 wherein maintaining a constant load on the wind electric plant thereby prevents fluctuating pressure created by the operation of said governor means from being applied to the propellers of the wind driven propeller means.

13. The wind electric plant defined in claim 11 wherein maintaining a constant load on the wind electric plant thereby prevents frequent operation of said governor means which thereby saves considerable wearing of the control parts of said governor means.

14. The wind electric plant defined in claim 11 wherein maintaining a constant load on the wind electric plant thereby prevents fluctuating pressure created by the operation of said governor means from causing strain of and possible damage to the tower.

15. The wind electric plant defined in claim 11 wherein maintaining a constant load on the wind electric plant thereby prevents fluctuating pressure created by the operation of said governor means from causing swaying of the wind electric plant and its supporting tower.

16. The wind electric plant defined in claim 15 wherein preventing the swaying of the wind electric plant and its supporting tower thereby prevents shifting of the propellers of the wind driven propeller means and prevents shifting of the hub mounts of the propellers which create considerable strain on the propellers and their hub mounts.

17. The wind electric plant defined in claim 16 wherein preventing shifting of the propellers and their hub mounts thereby prevents strain and vibration of and damage to the wind electric plant and its associated parts.

18. The wind electric plant defined in claim 17 wherein preventing straining and vibration of and damage to the wind electric plant thereby prevents jerking and shaking of the tall vane of the wind electric plant.

19. The improvement defined in claim 6 wherein the means included in said circuit means includes thermostatic switch means associated with said first load means, wherein said means to automatically divert the supply of A.C. power to and from said first load means and said second, auxiliary load means operates in accordance with the actuation of said thermostatic switch means.

20. The improvement defined in claim 19 wherein the said circuit means further includes electronic switch means operable therethrough to selectively supply A.C. power to said first load means and said second, auxiliary load means.

21. The improvement defined in claim 20 wherein said electronic switch means comprises a plurality of TRIAC devices.

22. The improvement defined in claim 4 further including third load means which includes a battery charging means and a storage battery means connected to be charged by said battery charging means.

23. The improvement defined in claim 22 further including circuit means operable to selectively supply A.C. power to said first load means and said second, auxiliary load means and to said third load means.

24. The improvement defined in claim 23 wherein said circuit means includes means to automatically divert the supply of A.C. power to and from said first load means and said second, auxiliary load means and said third load means, thereby maintaining a constant load on the wind electric plant to insure quiet operation of said wind electric plant even at times of strong wind conditions, and to thereby eliminate the occurrence of any damage to a wind electric plant caused when its load is removed therefrom.

25. The improvement defined in claim 24 wherein said second, auxiliary load means includes an air conditioning device.

26. The improvement defined in claim 24 wherein said second, auxiliary load means includes a hydrogen gas manufacturing device.

27. The improvement defined in claim 24 wherein said second, auxiliary load means includes ballast resistor means.

28. The improvement defined in claim 24 wherein said means included in said circuit means includes voltage regulator means operatively connected in circuit with said circuit means and operable to monitor the charge level of the storage battery means included in said third load means, whereby the said circuit means automatically diverts the supply of A.C. power to and from the said first load means and said second, auxiliary load means and said third load means accordingly in response to the monitored charge level of the said storage battery means.

29. The improvement defined in claim 24 wherein the means included in said circuit means includes thermostatic switch means associated with said first load means, wherein said means to automatically divert the supply of A.C. power to and from said first load means and said second, auxiliary load means and said third load means operates in accordance with the actuation of said thermostatic switch means.

30. The improvement defined in claim 29 wherein the said circuit means further includes electronic switch means operable therethrough to selectively supply A.C. power to said first load means and said second, auxiliary load means and said third load means.

31. The improvement defined in claim 30 wherein said electronic switch means comprises a plurality of TRIAC devices.

32. The improvement defined in claim 1 wherein said exciter means comprises in combination:
 (a) exciter armature means mounted on a rotatably driven shaft; and
 (b) exciter stator field frame means having a plurality of field poles and including permanent magnet means fixedly attached to each of said plurality of field poles.

33. The exciter defined in claim 32 wherein said permanent magnet means are fixedly attached to each of said plurality of field poles by bolt means.

34. The improvement defined in claim 1 wherein the wind electric plant is permitted to operate without the energy loss of battery current exciter field magnetic flux generation.

35. The improvement defined in claim 1 wherein the wind electric plant is permitted to operate without the cables and wires which connect a storage battery means and an electrical control circuit means located at ground level with the wind electric plant supported at the top of a tower.

36. A method of generating electricity from a wind electric plant including a wind driven alternator and an exciter means comprising the steps of:

(a) maintaining the magnetic field strength of the field of said exciter at a constant level over the entire speed range of said wind driven alternator; and
(b) energizing the field winding of said wind driven alternator via said exciter means.

37. The method defined in claim 36 further including the step of maintaining a constant electric load on the wind driven alternator to thereby insure quiet operation of the wind electric plant even at times of strong wind conditions, and to thereby eliminate the occurrence of any damage to a wind electric plant caused when its load is removed therefrom.

* * * * *